Sept. 20, 1949.    G. R. DUNCAN    2,482,579
MILK COOLER

Filed May 26, 1948    3 Sheets-Sheet 1

INVENTOR.
G. R. Duncan.
BY Victor J. Evans & Co.
ATTORNEYS

Sept. 20, 1949.　　　　　　　G. R. DUNCAN　　　　　　　2,482,579
MILK COOLER
Filed May 26, 1948　　　　　　　　　　　　　　　　3 Sheets-Sheet 2
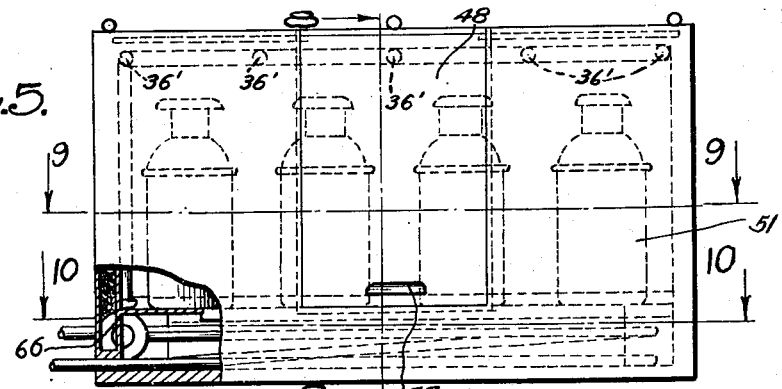
Fig. 5.
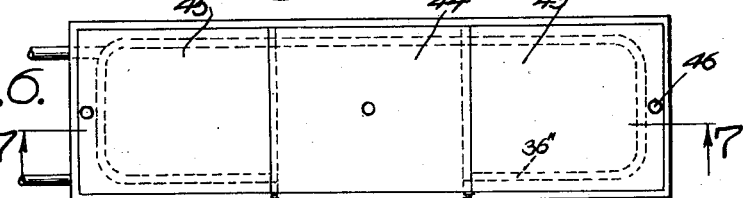
Fig. 6.
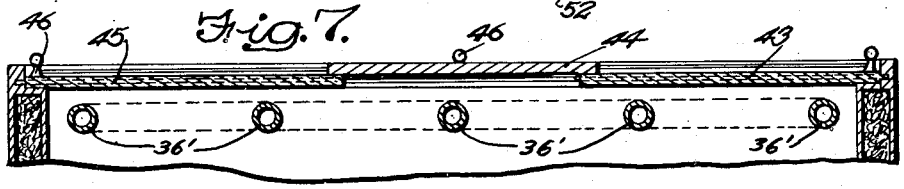
Fig. 7.
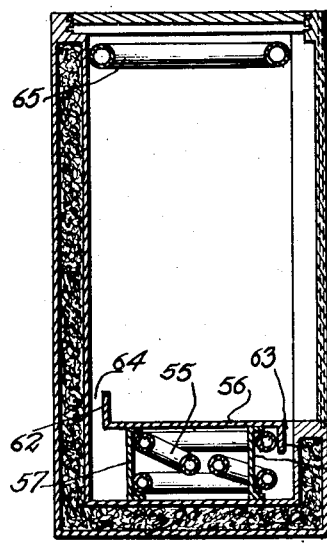
Fig. 8.
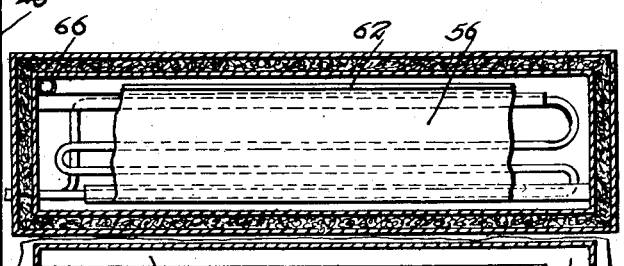
Fig. 9.
Fig. 10.
INVENTOR.
G. R. Duncan.
BY Victor J. Evans & Co.
ATTORNEYS

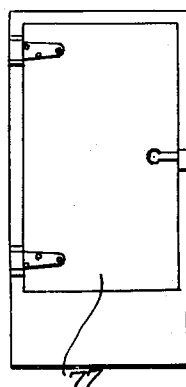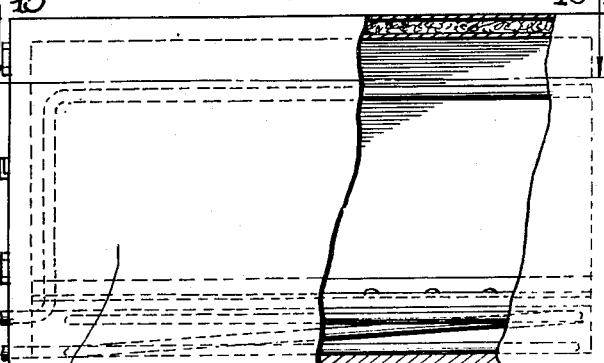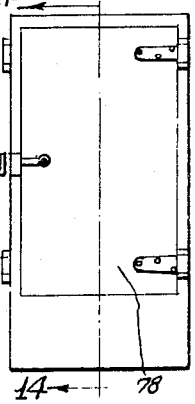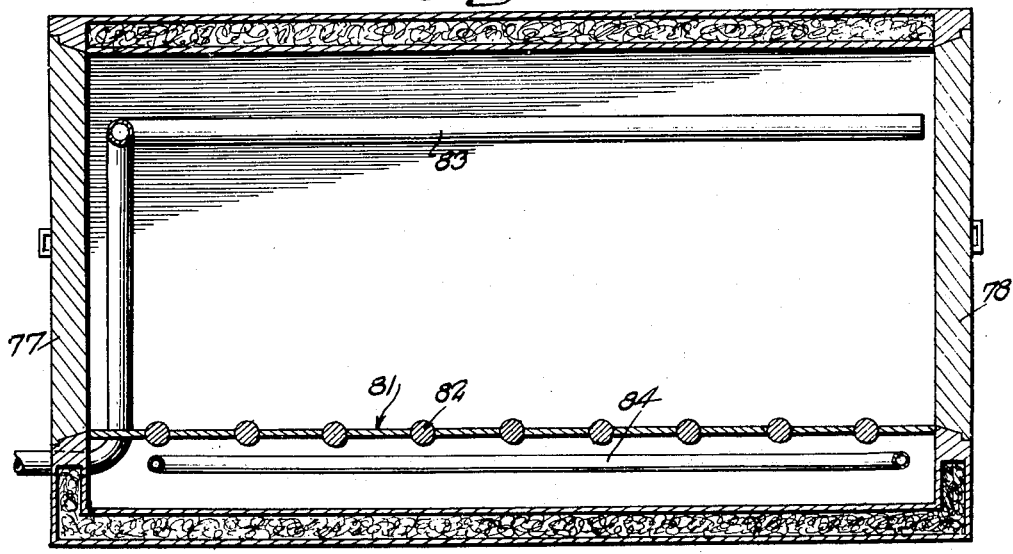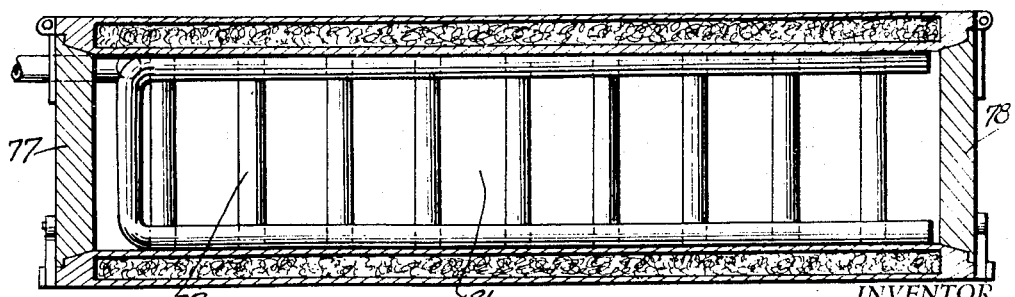

Patented Sept. 20, 1949

2,482,579

UNITED STATES PATENT OFFICE 2,482,579

MILK COOLER

George R. Duncan, Washington, Mo.

Application May 26, 1948, Serial No. 29,336

6 Claims. (Cl. 62—141)

This invention relates to milk coolers.

It is an object of the present invention to provide a milk cooler wherein water may be taken from the bottom of the cooler where it is cooled by cooling coils extended from the cooling plant, and delivered to the upper regions of the cooler and sprayed over the cans and thereafter returned to the bottom of the cooler to be cooled and wherein the water, when taken from the bottom of the cooler, is forced to take a circuitous path about the coils before arriving at the inlet of the pump whereby to obtain the maximum depletion of heat from the water before it is delivered for spraying the tops of the milk cans.

Other objects of the present invention are to provide a milk cooler which is of simple construction, which has a simple water cooling system, inexpensive to manufacture, durable and compact, has door arrangements which permit easy access to the cooler and efficient in operation.

For other objects and for a better understanding of the invention, reference may be had to the following detailed description taken in the connection of the accompanying drawings, in which Fig. 1 is a front elevational view of one form of the invention.

Figs. 2 and 3 are respectively transverse sectional views taken respectively on lines 2—2 and 3—3 of Fig. 1.

Fig. 5 is a front elevational view of a milk cooler having a different door opening including a slide opening door in the front of the cooler and a plurality of slide doors in the top of the cooler.

Fig. 6 is a top plan view of the cooler shown in Fig. 5.

Fig. 7 is a fragmentary and enlarged sectional view taken generally on line 7—7 of Fig. 6.

Fig. 8 is a sectional view, in elevation, taken on line 8—8 of Fig. 5.

Fig. 9 is a transverse sectional view taken on line 9—9 of Fig. 5.

Fig. 10 is a transverse sectional view taken on line 10—10 of Fig. 9 with the cooling pipes removed.

Fig. 11 is an elevational view of a modified form of cooler having doors in the opposite ends of the same.

Figs. 12 and 13 are respectively end views of the opposite ends of the cooler.

Fig. 14 is an enlarged elevational view of the cooler shown in Fig. 11, the view being taken on line 14—14 of Fig. 13.

Fig. 15 is a transverse sectional view of the cooler shown in Fig. 11 and taken on line 15—15 of Fig. 11.

Figure 1:
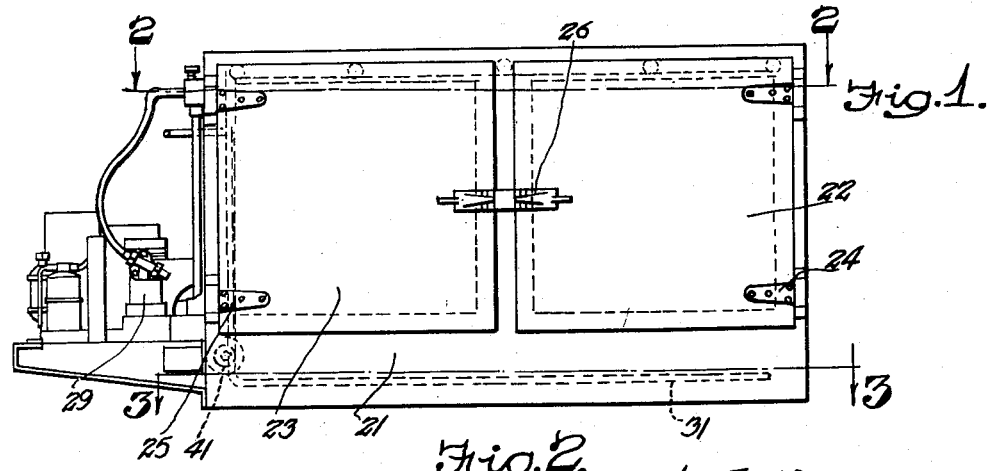

Referring now particularly to Figs. 1 to 4, 21 represents the front of a cooler in which there is provided two doors 22 and 23 each of which are respectively hinged as indicated at 24 and 25 respectively to the opposite ends of the front of the cooler. Latches 26 retain the doors in their closed positions. The walls of the cooler are insulated in the usual manner as indicated at 26' and have inner and outer side walls 27 and 28 respectively.

On one end of the cooler there is mounted a cooling plant 29 adapted to extend cold brine or other cooling fluid through a cooling coil 31 disposed in the bottom of the cooler. Over this coil there is extended a supporting means 32 on which milk cans are displaced and supported. The rack 32 is preferably formed with raised circular portions 33 adapted to provide recesses 34 for receiving the bottoms of the cans and whereby the cans will be properly spaced upon the rack 32. There are four of these openings 34 on the rack 32.

Extended over the top regions of the cooler are spray pipes 36 which extend from a main pipe 37. Water on the bottom of the cooler is elevated by means of a pump 41 to the pipes 37 and 36 and this water is sprayed over the milk cans whereby to keep the same cool. The water returns to the bottom of the cooler and is thoroughly cooled by the cooling pipe 31 lying on the bottom of the cooler. The above compartment between the bottom of the cabinet and the supporting means for the cans, which latter may be of any suitable construction, and a second compartment between the supporting means and the top of the cabinet. The first compartment contains coil 31, the pump inlet pipe and the drainage water from the sprays hereinafter described together with the ice bank that has formed around the coil. The second compartment is constructed to accommodate the milk cans in upright position as seen by dotted lines in Figure 5, and the spray pipe system including the individual spray pipes, and the header therefore, preferably supported on the inside of the rear vertical side wall as seen in dotted lines in Figure 1.

Referring now to Figs. 5 to 10, there is shown a modified form of cooler wherein the top of the cooler is provided with a series of slide doors 43, 44 and 45 having respectively handles 46 thereon by which the doors can be slid. At the front of the cooler there is provided a door 48 which can be elevated and removed in order to permit the placing of the milk cans as indicated at 51 through the front of the cooler. The door 48 is beaded at its sides as indicated at 52 and is retained in complementary grooves. A handle 53 is provided on the door 48 to effect the lifting of the same. The top slide doors are similarly constructed to slide within grooves in the front and rear sides of the cooler.

Figure 2:
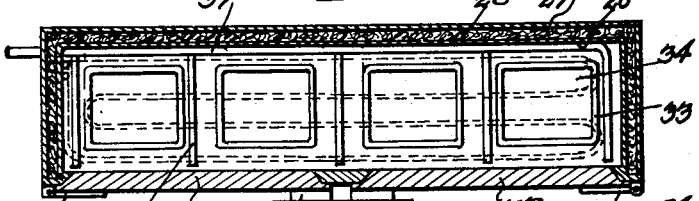
Figure 3:
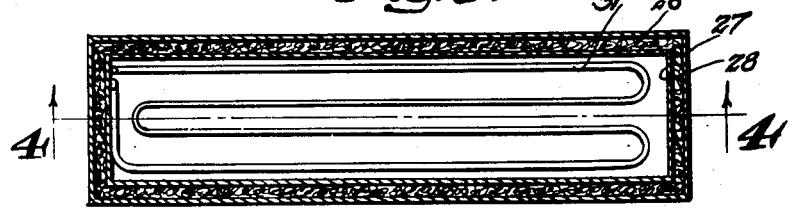
Figure 4:
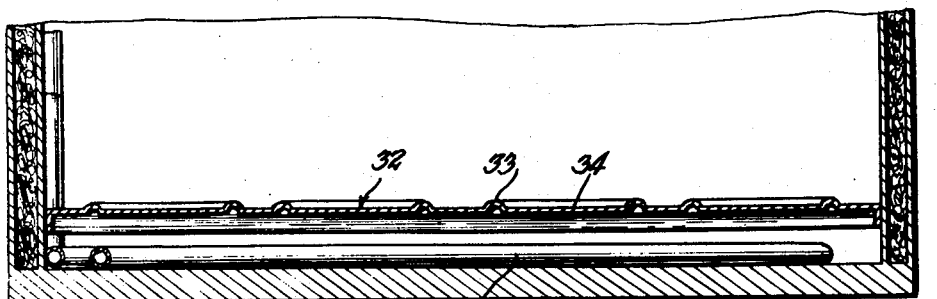
Fig. 4 is an enlarged fragmentary sectional view, in elevation, taken on line 4—4 of Fig. 3.

The spray pipes 36' are similar to those shown in Figure 2 at 36 except that there are extensions 36" which extend parallel to the back pipe and which terminate adjacent the door opening for door 48 which is at the front of the cooler.

Within the bottom of the cooler is a cooling coil 55 over which there is extended a support 56 for the cans. Channel members 57 and 58 support the member 56 in an elevated position above the bottom of the cooler.

In order to effect a circulation of air between the front and rear sides of the cooler and over the coils 55, the support member 56 is provided at the front and rear ends respectively with depending and upstanding flanges 61 and 62. These flanges are spaced from the inner sides of the cooler walls to provide respectively air passages 63 and 64.

At the top of the cooler a spray pipe arrangement 65 is located. Water which is taken from the bottom of the tank by the pump 66 is delivered to the spray pipe arrangement 65 and distributed over milk cans 51. The water which is collected on the support 56 will move toward the front of the cooler and will drop through the passage 63. The channels 57 and 58 provide baffles in the bottom of the tank whereby to cause the water to take a circuitous path over the cooling coils 55 before reaching pump 66 at one end and side of the tank. Water received in space 71 will pass through and around one end of channel 58 at 72, then through space 73 in the center and then around the end of channel 57 which is spaced from the opposite end of the tank at 74 and into space 75 before being received by the water pump for delivering the water to the top of the milk cooler casing.

Referring now to Figs. 11 to 15, there is shown a still further form of the invention wherein doors 77 and 78 are provided respectively upon the opposite ends of cooler 79. A rack 81 is provided at an elevated position and at the level of the bottom of the doors.

The cam support 81 is provided with rollers 82 on which the cans can be rolled into the cooler. A spray arrangement 83 is extended over the top area of the cooler while in the bottom there is disposed a cooling coil arrangement 84.

For many years it has been necessary to lift the contents of the coolers the full height of the walls thereof to remove the contents from the coolers. The present structure permits the contents to be lifted for a distance short of the full height of the walls of the cooler.

While various changes may be made in the detail construction, it shall be understood that such changes shall be within the spirit and scope of the present invention as defined by the appended claims.

I claim:

1. A milk cooler comprising a casing including an unperforated top, a plurality of sides and a bottom, door means, said door means having opening means provided with vertically spaced side edges and a lower edge, said opening means being located in one of said casing sides, can supporting means for supporting a plurality of milk cans in upright position whereby said cans may be inserted and withdrawn from said can supporting means through said doors means, said can supporting means being substantially parallel to said opening means lower edge, and said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall perforated pipe and a pair of fixed perforated pipes forming part of said spray means, each of said pair of pipes having an end which terminates adjacent to the top of one of said vertically spaced side edges of said door opening means and at least one additional perforated pipe having perforations adjacent both sides thereof for spraying adjacent milk cans, forming with said back wall perforated pipe another part of said spray means, said additional perforated pipe extending parallel with said pair of pipes and defining with one of them a space for the reception of a milk can, said opening means terminating short of either side wall of said casing to provide a front panel on either side of said door means, each of said pair of perforated pipes having an extension lying parallel to said back wall pipe and parallel to the inside walls of said panels.

2. A milk cooler comprising a casing including an unperforated top, a plurality of sides and a bottom, door means, said door means having opening means provided with vertically spaced side edges and a lower edge, said opening means being located in one of said casing sides, can supporting means for supporting a plurality of milk cans in upright position whereby said cans may be inserted and withdrawn from said can supporting means through said door means, said can supporting means being substantially parallel to said opening means lower edge, and said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall perforated pipe and a pair of fixed perforated pipes forming part of said spray means, each of said pair of pipes having an end which terminates adjacent to the top of one of said vertically spaced side edges of said door opening means and at least one additional perforated pipe having perforations adjacent both sides thereof for spraying adjacent milk cans, forming with said back wall perforated pipe another part of said spray means, said additional perforated pipe extending parallel with said pair of pipes and defining with one of them a space for the reception of a milk can, said opening means terminating short of either side wall of said casing to provide a front panel on either side of said door means, each of said pair of perforated pipes having an extension lying parallel to said back wall pipe and parallel to the inside walls of said panels, said cooling coil having conduits extending through said casing and connecting said cooling coil to said cooling plant.

3. A milk cooler comprising a casing including an unperforated top, a plurality of sides and a bottom, door means, said door means having opening means provided with vertically spaced side edges and a lower edge, said opening means being located in one of said casing sides, can supporting means for supporting a plurality of milk cans in upright position whereby said cans may be inserted and withdrawn from said can supporting means through said door means, said can supporting means being substantially parallel to said opening means lower edge, and said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall perforated pipe and a pair of fixed perforated pipes forming part of said spray means, each of said pair of pipes having an end which terminates adjacent to the top of one of said vertically spaced side edges of said door opening means and at least one additional perforated pipe having perforations adjacent both sides thereof for spraying adjacent milk cans, forming with said back wall perforated pipe another part of said spray means, said additional perforated pipe extending parallel with said pair of pipes and defining with one of them a sace for the reception of a milk can, said opening means terminating short of either side wall of said casing to provide a front panel on either side of said door means, each of said pair of perforated pipes having an extension lying parallel to said back wall pipe and parellel to the inside walls of said panels, said casing top being provided with door means.

4. A milk cooler comprising a casing including an unperforated top, a plurality of sides and a bottom, door means, said door means having opening means provided with vertically spaced side edges and a lower edge, said opening means being located in one of said casing sides, can supporting means for supporting a plurality of milk cans in upright position whereby said cans may be inserted and withdrawn from said can supporting means through said door means, said can supporting means being substantially parallel to said opening means lower edge, and said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall perforated pipe and a pair of fixed perforated pipes forming part of said spray means, each of said pair of pipes having an end which terminates adjacent to the top of one of said vertically spaced side edges of said door opening means and at least one additional perforated pipe having perforations adjacent both sides thereof for spraying adjacent milk cans, forming with said back wall perforated pipe another part of said spray means, said additional perforated pipe extending parallel with said pair of pipes and defining with one of them a space for the reception of a milk can, said opening means terminating short of either side wall of said casing to provide a front panel on either side of said door means, each of said pair of perforated pipes having an extension lying parallel to said back wall pipe and parallel to the inside walls of said panels, said casing top being provided with a plurality of doors.

5. A milk cooler comprising a casing including an unperforated top, a plurality of sides and a bottom, door means, said door means having opening means provided with vertically spaced side edges and a lower edge, said opening means being located in one of said casing sides, can supporting means for supporting a plurality of milk cans in upright position whereby said cans may be inserted and withdrawn from said can supporting means through said door means, said can supporting means being substantially parallel to said opening means lower edge, and said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall perforated pipe and a pair of fixed perforated pipes forming part of said spray means, each of said pair of pipes having an end which terminates adjacent to the top of one of said vertically spaced side edges of said door opening means and at least one additional perforated pipe having perforations adjacent both sides thereof for spraying adjacent milk cans, forming with said back wall perforated pipe another part of said spray means, said additional perforated pipe extending parallel with said pair of pipes and defining with one of them a space for the reception of a milk can, said opening means terminating short of either side wall of said casing to provide a front panel on either side of said door means, each of said pair of perforated pipes having an extension lying parallel to said back wall pipe and parallel to the inside walls of said panels, said door means being slidable in a vertical direction.

6. A milk cooler comprising a casing including an unperforated top, a plurality of sides and a bottom, door means, said door means having opening means provided with vertically spaced side edges and a lower edge, said side edges being a distance apart from each other such as to permit the entry or withdrawal of at least two cans at one time, said opening means being located in one of said casing sides, can supporting means for supporting a plurality of milk cans in upright position whereby said cans may be inserted and withdrawn from said can supporting means through said door means, said can supporting means extending from one to the other of a pair of parallel side walls in a single plane parallel to said opening means lower edge, said can supporting means being located above said bottom to provide a water cooling and ice forming chamber between said bottom and said can supporting means, the distance from said can supporting means to the underside of said top being sufficient for supporting milk cans with their covers in position thereon in upright position, a cooling plant, a cooling coil located in said water cooling and ice forming chamber whereby a cooling fluid may be circulated through said cooling coil from said cooling plant and return thereto, a spray system comprising a pump, an inlet extending from said pump into said water cooling and ice forming chamber, conduit means extending from said pump to adjacent the inner back wall of said casing and along both of the inner side walls and closely adjacent thereto, a plurality of spray means in said conduit means whereby said milk cans may be simultaneously sprayed by water after it has been cooled in said water cooling and ice forming chamber and conveyed to said conduit means, and said conduit means including a back wall pipe and a pair of fixed perforated pipes forming part of said spray means, each of said pair of pipes having an end which terminates adjacent to the top of one of said vertically spaced side edges of said door opening means and at least one additional perforated pipe means having perforations adjacent both sides thereof for spraying adjacent milk cans, forming with said back wall pipe another part of said spray means, said additional perforated pipe means extending parallel with said pair of pipes and defining with at least one of them a space for the reception of a milk can, said space for the reception of a milk can being unobstructed from said can supporting means to the underside of said unperforated top.

GEORGE R. DUNCAN.

REFERENCES CITED

The following references are of record in the file of this patent:

UNITED STATES PATENTS

| Number | Name | Date |
| --- | --- | --- |
| 2,140,744 | Hirsch | Dec. 20, 1938 |
| 2,140,895 | Bruce | Dec. 20, 1938 |
| 2,140,896 | Bruce | Dec. 20, 1938 |
| 2,153,980 | Feldbush | Apr. 11, 1939 |
| 2,218,602 | Carryl | Oct. 22, 1940 |
| 2,256,971 | Chamberlain | Sept. 23, 1941 |
| 2,380,901 | Chamberlain | July 31, 1945 |